United States Patent
Gaucher et al.

(10) Patent No.: US 6,754,259 B1
(45) Date of Patent: Jun. 22, 2004

(54) LOW-COST RADIO FREQUENCY (RF) LINK FOR POINT-TO-POINT DATA TRANSFER

(75) Inventors: Brian Paul Gaucher, New Milford, CT (US); Charles L. Haymes, Wesley Hills, NY (US); Modest M. Oprysko, Carmel, NY (US); Mark B. Ritter, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,058

(22) Filed: Nov. 10, 1999

(51) Int. Cl.[7] .............................. H04B 1/38; H04L 5/16
(52) U.S. Cl. ...................... 375/222; 375/219; 375/259
(58) Field of Search ................................. 375/219, 222, 375/259; 370/447; 348/734; 709/227; 359/163; 340/825.72; 455/557, 420; 700/83; 345/168; 398/41

(56) References Cited

U.S. PATENT DOCUMENTS

| | | | |
|---|---|---|---|
| 4,090,067 A | 5/1978 | Bell, III et al. | |
| 4,402,090 A | 8/1983 | Gfeller et al. | |
| 4,481,640 A | 11/1984 | Chow et al. | |
| 4,775,928 A | 10/1988 | Kendall et al. | |
| 4,809,257 A | 2/1989 | Gantenbein et al. | |
| 5,029,183 A | 7/1991 | Tymes | |
| 5,528,621 A | 6/1996 | Heiman et al. | |
| 5,636,264 A | * 6/1997 | Sulavuori et al. | 398/41 |
| 5,684,801 A | * 11/1997 | Amitay et al. | 370/447 |
| 6,407,779 B1 | * 6/2002 | Herz | 348/734 |
| 6,434,187 B1 | * 8/2002 | Beard et al. | 375/219 |
| 6,519,644 B1 | * 2/2003 | Lindquist et al. | 709/227 |

* cited by examiner

*Primary Examiner*—Stephen Chin
*Assistant Examiner*—Curtis Odom
(74) *Attorney, Agent, or Firm*—Thu Ann Dang, Esq.; McGinn & Gibb, PLLC

(57) ABSTRACT

An apparatus for data transfer using radio frequency (RF) energy, includes a first software application that sources and links the data transfer, a second software application for controlling a communications hardware for the data transfer, a hardware device for formatting the data and gaining access to a media, and a physical layer interface hardware, coupled to selectively receive a signal representing the data from the hardware device and to provide an output to the hardware device, for sending and receiving a radio frequency communication. The second software application for controlling the communications hardware uses a target data transmission media of infrared light.

39 Claims, 2 Drawing Sheets

INFRARED LIGHT BEARING MESSAGE

RF ENERGY BEARING MESSAGE

LOW-COST RADIO FREQUENCY (RF) LINK FOR POINT-TO-POINT DATA TRANSFER

BACKGROUND OF THE INVENTION

1. Field of the Invention

The present invention generally relates to wireless communication, and more particularly to a radio design with infrared (IR) wireless modulation and interface capability.

2. Description of the Related Art

In the field of point-to-point data transfer, designing radio frequency (RF) communications subsystems to operate in modern computers presents many challenges and problems for engineers. For example, conventional RF solutions often employ Personal Computer Memory Card International Association (PCMCIA) adapters which are costly even before factoring the expense of the RF transceiver hardware.

Some new RF links are in development (e.g., "Blue-Tooth"® from Ericsson and Nokia) which promise to be inexpensive. However, in order to be integrated into current laptop and desktop computer systems these new links require new hardware and software to be developed and distributed.

Thus, even though the above-mentioned new RF links (e.g., BlueTooth®) may have a lower cost once in production as compared to existing RF communication links, these new communication links require considerable development time and expense to be integrated into present laptop and desktop computer systems.

Furthermore, while there have been efforts to provide lower cost RF links, these efforts have "over-designed" or "over-specified" the links, thereby requiring new hardware and/or software to operate. Thus, hitherto the present invention, the leveraging of existing infrastructure (e.g., hardware and software already developed and used by the IR wireless industry) has not been possible, and thus such new links have been expensive and cumbersome to implement.

Other problems include that the current IR wireless solutions require aiming (e.g., aligning) the two devices. Also, IR solutions do not work well in sunlight.

SUMMARY OF THE INVENTION

In view of the foregoing and other problems, drawbacks, and disadvantages of the conventional systems, an object of the present invention is to provide an RF communication subsystem with an IR interface for use in a computing device.

In a first aspect of the invention, an apparatus for data transfer using radio frequency (RF) energy, includes a first software application that sources and links the data transfer, a second software application for controlling a communications hardware for the data transfer, a hardware device for formatting the data and gaining access to a media, and a physical layer interface hardware, coupled to selectively receive a signal representing the data from the hardware device and to provide an output to the hardware device, for sending and receiving a radio frequency communication.

With the present invention, an RF transceiver is employed which can be directly modulated with an Infrared Data Association (IrDA) modem and software hierarchy used currently in the vast majority of laptops, desktops, and Personal Data Assistants (PDA). A direct benefit of using the existing modem and software hierarchy is that implementation costs and time are minimized.

The invention overcomes the shortcomings of the related art by replacing the IR transceiver with an RF transceiver having the necessary characteristics.

While the described embodiment of the invention uses IrDA modulation to send and receive data over a 900-MHZ RF link, any RF frequency can be used, provided the RF transceiver can be modulated directly with Return-to-Zero Inverted (RZI), or Non-Return-to-Zero Inverted (NRZI) data.

Additionally, an embodiment of a radio incorporating the present invention provides a variable transmit bandwidth and therefore variable data rates as permitted by the IR stack. This configuration produces a radio having a low cost to effectively compete with proposed wireless systems.

It is noted that, while a non-limiting embodiment of the present invention is described with regard to direct application of the IR Non-Return Zone (NRZ) waveform to the RF module and the exemplary systems specify FM (or more aptly frequency-shift keying (FSK) systems), virtually any modulation scheme may be used with the present invention. Thus, for example, modulation schemes may include amplitude modulation (AM), frequency modulation (FM), X-phase shift keying ("X"-PSK) where X is the number of possible phases (e.g., 16-PSK has one of 16 possible values, with each time interval allows 4 bits to be transferred), M level-Quadrature Amplitude Modulation (M-QAM), etc.

Additionally, in a further embodiment, interface modules can be added between the IR and RF interface to modify the NRZ signal to any suitable form.

In another embodiment, the NRZ signal from the IR module is extracted and used as an input to an FM or FSK radio. Even when the radio is not tuned to this function, it can demonstrate the principle directly up to 56 Kbps. The limiting factor in such an embodiment is the Voltage Control Oscillator (VCO) and receive filters.

Thus, with the invention, an RF transceiver is employed which can be directly modulated with the IrDA modem and software hierarchy used currently in the vast majority of laptops, desktops, and PDAs. Thus, by using the existing modem and software hierarchy, implementation costs and time are minimized.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
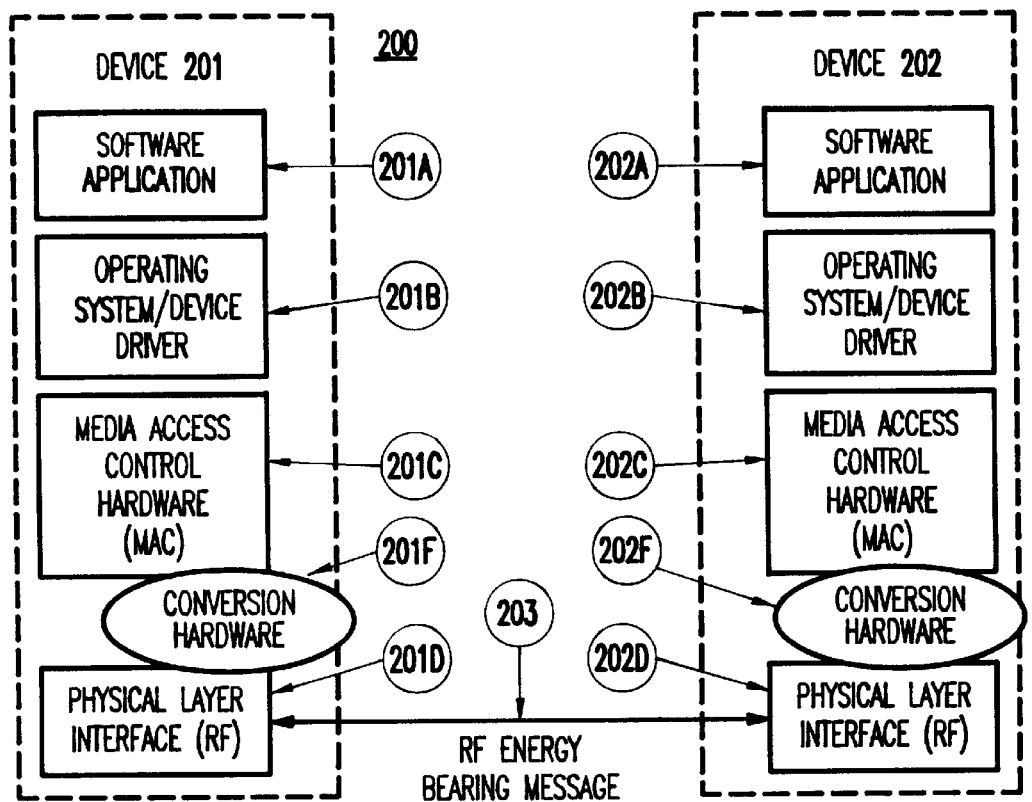
FIG. 2 shows a first embodiment of an IR communication system for a computer according to the present invention.

Referring now to the drawings, and more particularly to FIGS. 2–3, a preferred embodiment of the invention is illustrated and described below.

Figure 1:
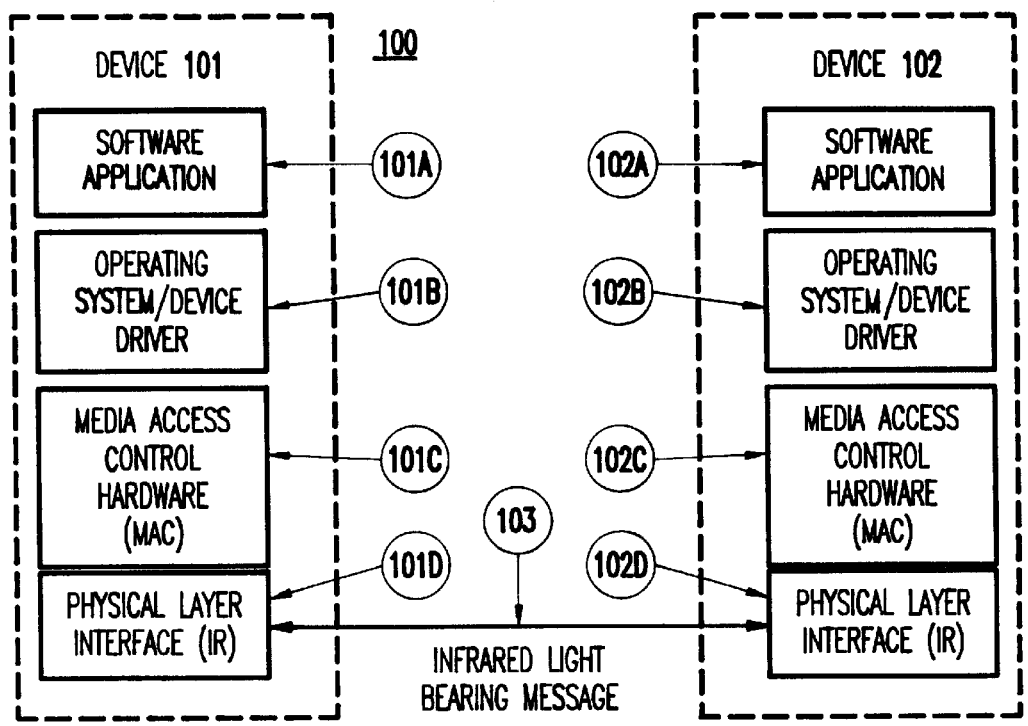
FIG. 1 shows a conventional IR communication system for a computer.

First, in FIG. 1, a conventional IR communication system 100 in a computer is shown. The communication system includes two independent devices (e.g., PDA-to-computer, laptop-to-desktop computer, computer-to-printer, etc.). A first device 101 and a second device 102 are depicted inside the dotted rectangles. Each device has a combination of software and hardware components for communicating with each other via wireless media of infrared light 103 in free space as used in conventional configurations (e.g., see U.S. Pat. Nos. 4,090,067, 4,402,090 and 4,809,257, each incorporated herein by reference).

An infrared medium 103 for carrying the infrared light bearing message is the medium for communication between the two devices 101, 102.

An exemplary reference for wireless media of infrared light in free space is defined by the Infrared Data Association (IrDA). Other references could be similarly used as would be known by one of ordinary skill in the art taking the present invention as whole.

Thus, FIG. 1 shows an IrDA system implementation, where an infrared transceiver sends and receives wireless data in a modulation format specified by the IrDA standard. Each device 101, 102 has a software application (e.g., 101A, 102A) that sources and links messages, an operating system and device driver 101B, 102B which is a low level software for controlling the communications hardware, a Media Access Control (MAC) hardware device 101C, 102C for formatting the data and gaining access to the media, and physical layer interface (IR) hardware 101D, 102D.

This system, like other conventional systems, must be aligned and does not work in sunlight.

Preferred Embodiment

Turning now to FIG. 2, a communication system according to the present invention will be described. The present invention modifies the standard combination, as described above, of software and hardware components found in an infrared communications system to deliver data across an alternative media (e.g., alternative to IR) of RF energy. As illustrated in FIG. 2, by removing the infrared transceiver and replacing it with a RF transceiver with the proper characteristics, the IrDA modulation can be used to send and receive data over a 900-MHZ RF link.

Infrared systems must dynamically add and delete mobile users into and out of an active network (e.g., dynamic media access) and also cope with non-optimal signal transmission (e.g., error recovery). These attributes are contained in the software and MAC layers of the IR communications "stack" (e.g., items 101A, 102A; 101B, 102B; and 101C, 102C).

The system according to the preferred embodiment of the present invention replaces the physical layer interface 101D, 102D of the conventional communication system in each computer with an RF radio (e.g., schematically illustrated and described below as interfaces 201D, 202D). The RF radio implements a digital modulation protocol routing the data over RF radio waves rather than the IR transmission spectrum.

FIG. 2 shows the two communicating devices with the modified data flow. Items 201A, 201B, 201C, 202A, 202B, and 202C represent the same functional blocks 101A, 101B, 101C, 102A, 102B, and 102C shown in FIG. 1 (e.g., application software, device driver/operating system and MAC). Items 101D and 102D have been replaced with RF radio 201D and 202D, and item 203 represents the RF media instead of an IR media. It is noted that the MAC (201C and 202C) must have a data rate that is comparable to the RF modem (201D and 202D).

Currently, available data radios contain physical layer circuits and MAC (framing and formatting) functions. However, hitherto the present invention, they could not be used with IR because they could not be simply connected. The present invention divides (e.g., splits) the physical layer from the data radio, and allows their swapping at that functional interface.

Embodiments of the invention can use virtually any RF modulation scheme available (e.g., AM, FM, "X"PSK, M-ary QAM etc.). Hardware conversion circuitry 201F, 202F is used to connect the existing IR media access hardware to the RF physical layer hardware 201D and 202D.

Figure 3A:
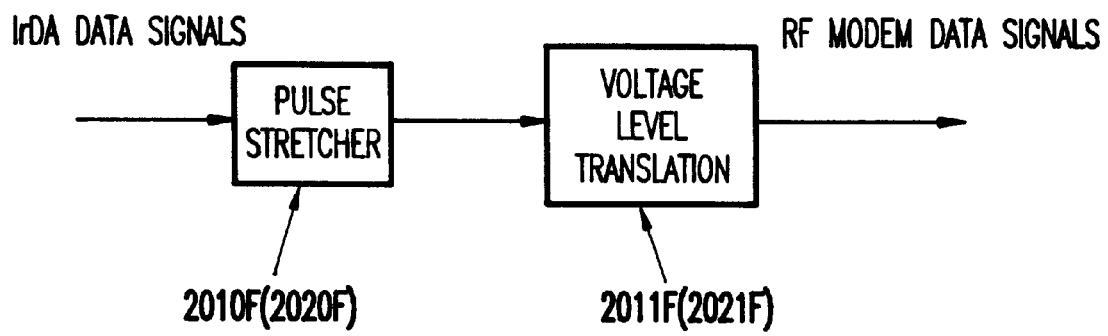
FIGS. 3A–3B illustrate the functions contained within the conversion hardware circuitry 201F, 202F of the system according to the present invention shown in FIG. 2.
Figure 3B:
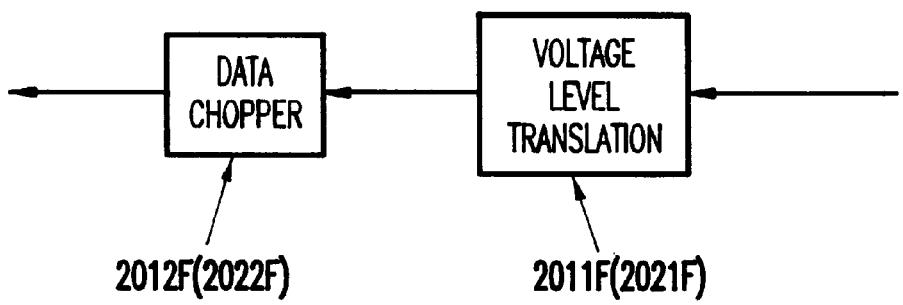

FIGS. 3A–3B depict functions contained within the conversion circuitry 201F, 202F for connecting the currently used IrDA media access hardware 201C, 202C to an RF modem 201D, 202D in an implementation of the invention.

As shown in FIG. 3A IrDA data signals are received by a pulse stretcher 2010F (2020F), which in turn stretches the signals and provides them to a voltage level translation unit 2011F (2021F), which in turn produces the RF modem data signals.

Similarly, as shown in FIG. 3B, RF modem signals received are passed through a voltage level translation unit (which may be the same as that shown in FIG. 3A) and in turn provided to a data chopper 2012F (2022F) to provide the IrDA data signals.

While the IrDA MAC 101C, 102C uses Return-to-Zero (RZ) signaling to pass digital data to the IR physical layer interface 101D, 102D, the RF modem in the system according to the present invention uses expected Non-Return-to-Zero (NRZ) signaling at different voltage levels. It is noted that such IR MAC and radio do not use the same signaling. However, if the signaling were to match, there would be no need for the hardware conversion blocks 201F and 202F.

As mentioned above, the signals output from the IrDA MAC hardware 201C, 202C to the RF modem, via the conversion circuitry 201F, 202F are stretched with the pulse stretcher 2010F (2020F) (e.g., shown in FIG. 3A) to fill the whole data bit time. As noted above, this structure allows the IR MAC and the radio to communicate with each other. A custom-built radio would not necessarily need such a conversion.

The voltage levels are adjusted from Transistor-transistor Logic (TTL) to, for example, +/−7 volt differential using the voltage level translation unit(s) 2011F (2021F). Other volt differentials could be suitably and advantageously used. Such an operation conforms to EIA standard for RS-232 communication protocols. In the present example, the radio was designed to connect to a RS-232 serial port.

Conversely, as described above, the signals going from the RF modems 201D, 202D to the conversion circuitry 201F, 202F are changed from the +/−7 volt differential to voltage level translation unit (e.g., TTL) 2011F (2021F) and changed to RZ signaling using the data chopper 2012F (2022F), as shown in FIG. 3B.

An alternative RF modem design, using RZ and TTL signaling, is to connect the RF modem directly to the IrDA MAC bypassing the conversion circuitry 201F, 202F.

The advantages of the preferred embodiment over conventional infrared communication include that RF communication does not require direct line-of-sight paths to establish a communications link. Further, RF transmissions can pass through building walls and will work in direct sunlight, while current IR systems cannot.

Additionally, with the invention, implementation time is reduced and less costly than alternatives. The invention teaches a design allowing a radio to meet the IR wireless modulation scheme and interfacing requirements without extensive new development.

It is noted that any RF frequency could be used, as long as the RF transceiver can be modulated directly with RZI, or NRZI data. An embodiment of the invention teaches extracting the NRZ signal from the IR module and using it as an input to a FM or FSK radio. In a demonstration of the invention, the radio while not being tuned to this function demonstrated the principal directly up to 56 Kbps. A limiting factor is the voltage-controlled oscillator (VCO) and receive filters of the radio.

To effectively implement this idea, a radio can be built that allows for variable transmit bandwidth and therefore variable data rates as allowed by the IR stack. To compete effectively against proposed wireless systems, the radio is intentionally low cost and low performance by design. Though one could add interface modules between the IR and RF interface to modify the NRZ signal to any suitable form, this discussion is limited to direct application of the IR NRZ wave form to the RF module. Further, any modulation scheme may be applied to this problem (AM, FM, "X"PSK, M-QAM, etc.), however the illustrated embodiment is limited to FM or more aptly FSK systems.

While the invention has been described in terms of preferred embodiments, those skilled in the art will recognize that the invention can be practiced with modification within the spirit and scope of the appended claims.

For example, beyond the simplest application of a cheap RF link, a communication adapter could be built to incorporate an IR and/or RF physical layer. If two devices were close enough and properly aligned, they could use IR. Otherwise, the two devices could switch over to establish an RF connection. Thus, in this modification, the IR would generally support a higher data rate, but the RF would provide better connectivity.

What is claimed is:

1. An apparatus for data transfer using radio frequency (RF) energy, said apparatus comprising:
   a first software application that sources and links said data transfer;
   a second software application for controlling a communications hardware for said data transfer;
   a hardware device for formatting said data and gaining access to a media; and
   a physical layer interface hardware, coupled to selectively receive a signal representing said data from said hardware device and to provide an output to said hardware device, for sending and receiving a radio frequency communication;
   a circuit, coupled between said hardware device and said physical layer interface hardware, for translating signals representing said data, from said hardware device, and for producing an output,
   wherein said second software application for controlling said communications hardware uses a target data transmission media of infrared light,
   wherein said circuit comprises a hardware conversion circuit for translating signals between said hardware device and said physical layer interface hardware, said signals comprising electrical signals, and
   wherein said hardware conversion circuit comprises a pulse stretcher for expanding said signals to fill an entire data bit time for said data transfer.

2. The apparatus as claimed in claim 1, wherein said hardware device for formatting the data and gaining access to the media uses the target data transmission media of infrared light.

3. The apparatus as claimed in claim 1,
   wherein said second software application for controlling communications hardware comprises a device driver.

4. The apparatus as claimed in claim 1,
   wherein said hardware device for formatting the data and gaining access to the media comprises a media access controller.

5. The apparatus as claimed in claim 1, wherein said physical layer interface hardware utilizes a target data transmission media of radio frequency electromagnetic waves.

6. The apparatus as claimed in claim 1, wherein said physical layer interface is selectively coupled to a plurality of users in communication via a wireless radio frequency network.

7. The apparatus as claimed in claim 1, wherein said physical layer interface selectively couples together two users in communication for point-to point data transfer via a wireless radio frequency network.

8. The apparatus as claimed in claim 1, wherein said first software application that sources and links said data transfer and said second software application for controlling communications hardware use data transferable exclusively via an infrared light media in free space.

9. The apparatus as claimed in claim 1, wherein said hardware device for formatting said data, said physical layer interface hardware for sending and receiving said radio frequency communication, and said hardware conversion circuit for translating said electrical signals use data transferable via an infrared light medium in free space and a radio frequency electromagnetic waves medium.

10. The apparatus as claimed in claim 9, wherein said medium of radio frequency electromagnetic waves comprises at least one of amplitude modulation (AM) waves, frequency modulation (FM), "X"-phase shift keying ("X" PSK), and M-ary quadrature amplitude modulation (M-QAM).

11. The apparatus as claimed in claim 8, wherein said infrared light media in free space includes IrDA.

12. The apparatus as claimed in claim 1, wherein said physical layer interface hardware and said hardware device are coupled directly together.

13. An apparatus for wireless data transfer, said apparatus comprising:
   an infrared transceiver for transferring data;
   a radio frequency transceiver for communicating a signal with said infrared transceiver; and
   a conversion circuit for connecting said infrared transceiver and said radio frequency transceiver, transceiver,
   wherein said conversion circuit comprises:
      a pulse stretcher for expanding said signal to fill an entire data bit time for said wireless data transfer;
      a voltage level translator for adjusting a voltage of said signal; and
      a data chopper for compressing said signal filling a whole data bit time.

14. The apparatus as claimed in claim 13, wherein said conversion circuit receives a first signal from said infrared transceiver and outputs said first signal to said radio frequency transceiver, and
   wherein said conversion circuit receives a second signal from said radio frequency transceiver and outputs said second signal to said infrared transceiver.

15. The apparatus as claimed in claim 14, wherein said radio frequency transceiver comprises a physical layer interface for receiving said first signal.

16. The apparatus as claimed in claim 15, wherein said radio frequency transceiver transmits said first signal in a wireless manner.

17. The apparatus as claimed in claim 14, wherein said radio frequency transceiver receives said second signal over a wireless medium.

18. The apparatus as claimed in claim 15, wherein said radio frequency transceiver sends a first signal and receives a second signal using a digital modulation protocol.

19. A system for data transfer using radio frequency (RF) energy, said system comprising:
- a first computing device having a first RF transceiver in a first infrared (IR) modem;
- a second computing device having a second RF transceiver in a second IR modem; and
- a conversion circuit for translating signals between said first RF transceiver and said first IR modem,
- wherein said conversion circuit comprises a pulse stretcher for expanding said signals to fill an entire data bit time for said wireless data transfer,
- wherein said first RF transceiver transmits an RF data signal from said first IR modem to said second RF transceiver, and
- wherein said second IR modem receives said RF data signal.

20. The apparatus as claimed in claim 19, wherein said conversion circuit comprises a hardware conversion circuit, in said first IR modem.

21. A system for data transfer using radio frequency (RF) energy, said system comprising:
- a first computing device having a first RF transceiver in a first infrared (IR) modem;
- a second computing device having a second RF transceiver in a second IR modem; and
- a hardware device for encoding/decoding said RF signals in each of said first and second IR modems,
- wherein said first RF transceiver transmits an RF data signal from said first IR modem to said second RF transceiver, and
- wherein said second IR modem receives said RF data signal,
- wherein said hardware device comprises a conversion circuit for translating signals between said first RF transceiver and said first IR modem, and
- wherein said conversion circuit comprises a pulse stretcher for expanding said signals to fill an entire data bit time for said wireless data transfer.

22. The apparatus as claimed in claim 1, wherein said conversion circuit further comprises a voltage level translator for adjusting a voltage of said signals.

23. The apparatus as claimed in claim 1, wherein said conversion circuit further comprises a data chopper for compressing said signal filling a whole data bit time.

24. The apparatus as claimed in claim 19, wherein said conversion circuit further comprises a voltage level translator for adjusting a voltage of said signals.

25. The apparatus as claimed in claim 19, wherein said conversion circuit further comprises a data chopper for compressing said signal filling a whole data bit time.

26. The apparatus as claimed in claim 19, wherein said conversion circuit receives a first signal from said first IR modem and outputs said first signal to said first RF transceiver, and
- wherein said conversion circuit receives a second signal from said first RF transceiver and outputs said second signal to said first IR modem.

27. The apparatus as claimed in claim 26, wherein said first RF transceiver comprises a physical layer interface for receiving said first signal.

28. The apparatus as claimed in claim 27, wherein said first RF transceiver transmits said first signal in a wireless manner.

29. The apparatus as claimed in claim 26, wherein said first RF transceiver receives said second signal over a wireless medium.

30. The apparatus as claimed in claim 27, wherein said first RF transceiver sends a first signal and receives a second signal using a digital modulation protocol.

31. The apparatus as claim 21, wherein said conversion circuit further comprises a voltage level translator for adjusting a voltage of said signals.

32. The apparatus as claimed in claim 21, wherein said conversion circuit further comprises a data chopper for compressing said signal filling a whole data bit time.

33. The apparatus as claimed in claim 21 wherein said conversion circuit receives a first signal from said first IR modem and outputs said first signal to said first RF transceiver, and
- wherein said conversion circuit receives a second signal from said first RF transceiver and outputs said second signal to said first IR modem.

34. The apparatus as claimed in claim 33, wherein said first RF transceiver comprises a physical layer interface for receiving said first signal.

35. The apparatus as claimed in claim 34, wherein said first RF transceiver transmits said first signal in a wireless manner.

36. The apparatus as claimed in claim 33, wherein said first RF transceiver receives said second signal over a wireless medium.

37. The apparatus as claimed in claim 34, wherein said first RF transceiver sends a first signal and receives a second signal using a digital modulation protocol.

38. The apparatus as claimed in claim 19, wherein said conversion circuit translates signals between said second RF transceiver and said second IR modem.

39. The apparatus as claimed in claim 21, wherein said conversion circuit translates signals between said second RF transceiver and said second IR modem.

* * * * *